Nov. 14, 1939.  A. D. CARPENTER  2,179,586
TRAILER
Filed Feb. 16, 1937   2 Sheets-Sheet 1

Arley D. Carpenter,
INVENTOR

BY Victor J. Evans & Co.
ATTORNEYS

P. L. Hickey
WITNESS

Nov. 14, 1939.  A. D. CARPENTER  2,179,586
TRAILER
Filed Feb. 16, 1937   2 Sheets-Sheet 2

Arley D. Carpenter,
INVENTOR

BY Victor J. Evans & Co.
ATTORNEYS

WITNESS

Patented Nov. 14, 1939

2,179,586

UNITED STATES PATENT OFFICE 2,179,586

TRAILER

Arley D. Carpenter, Los Angeles, Calif.

Application February 16, 1937, Serial No. 126,087

4 Claims. (Cl. 280—33.4)

This invention relates to trailers of the general type described in my pending application for patent on trailer, filed August 28, 1935, Serial No. 38,300, Patent No. 2,104,734, issued January 11, 1938.

An object of the present invention is to generally improve trailer construction of this type by the provision of a novel draft frame pivotally suspended at two longitudinally spaced points from the main frame of the trailer so as to rock laterally to conform to inequalities in the roadbed without requiring the use of guides for directing such rocking movement, guides having been found in practice to become easily worn and susceptible to breakage.

A further object of the invention is to provide the main frame of the trailer with a substantially X-shaped reinforcing brace the arms of which are rigidly connected to the corners of the main frame, the X-shaped brace, at the crossing of its arms, supporting the rear hanger for the rear pivot of the rocking draft frame so that the draft strain will be distributed more uniformly throughout the entire braced frame than hitherto possible with resultant increase in strength of the parts to resist damage.

A further object is to provide a novel cross bar upon which the caster wheels are yieldably supported so that wear is automatically taken up and rattling prevented, the cross brace being supported at the ends by the trailer leaf springs and tying the springs together so that both springs flex as a unit in resisting shocks and jars to which the caster wheels are subjected.

A further object is to provide the draft frame with novel draft tongues which may be adjusted vertically and laterally to promote easy application to the rear bumper of an automobile.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1:
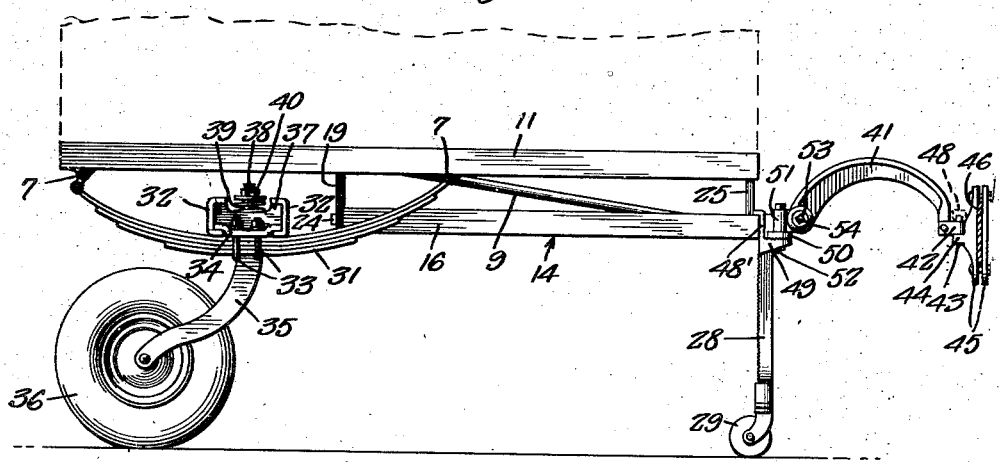
Figure 1 is a side elevation of a trailer main frame, pivoted draft frame, caster wheels and draft tongues, constructed in accordance with the invention.

Referring now to the drawings in which like characters of reference designate similar parts in the various views, the trailer main frame is shown to comprise side bars 10 and 11, and front and rear bars 12 and 13.

Figure 3:
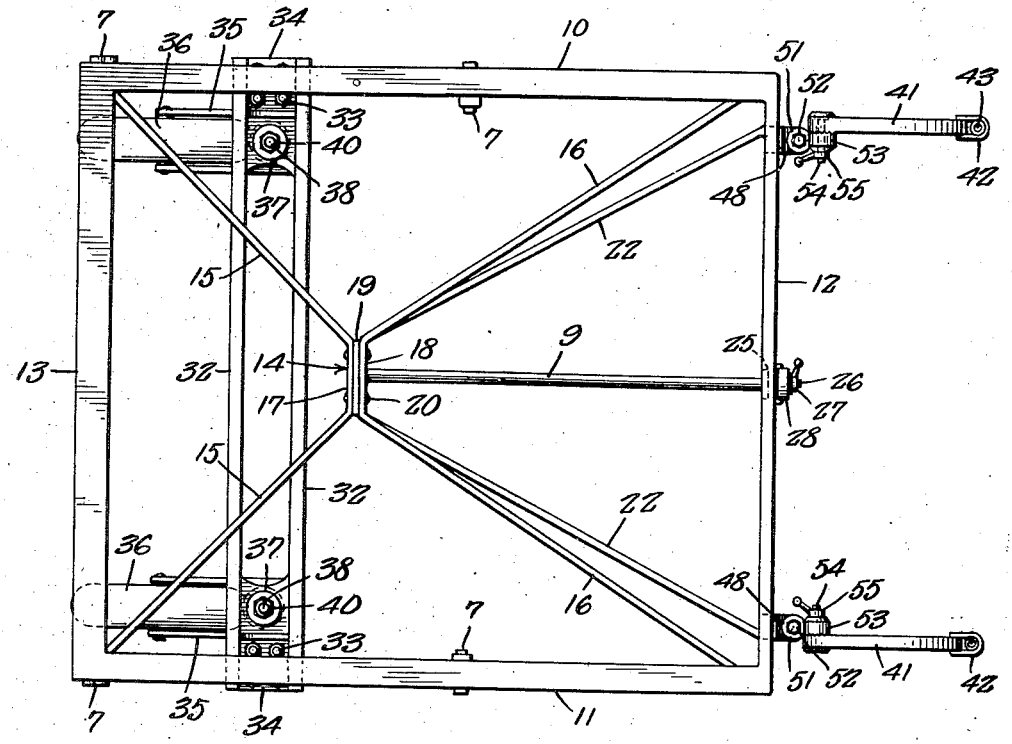
Figure 3 is a plan view of the parts shown in Figure 1.
Figure 4:
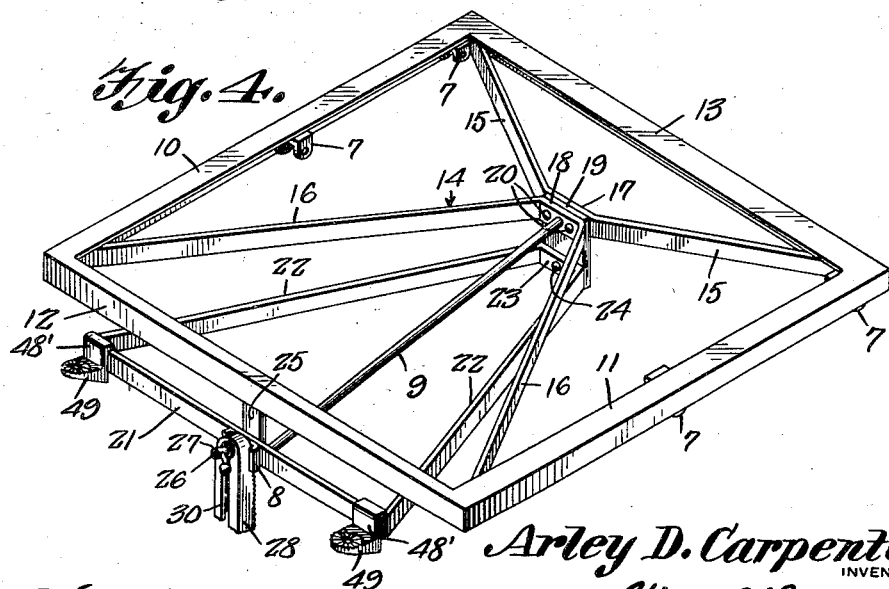
Figure 4 is a perspective view of the reinforced main frame of the trailer and showing the substantially triangular draft frame pivoted thereon with the draft tongues removed.

In carrying out the invention the frame is braced by a substantially X-shaped brace designated in general by the numeral 14 and best shown in Figures 3 and 4. The X-shaped brace comprises diverging rear bars 15 which are spot welded or otherwise rigidly secured at their ends to the rear corners of the main frame. The X-shaped brace also includes diverging front bars 16 which are spot welded or otherwise secured at their outer ends to the front corners of the frame. Both bars 15 are connected at their front ends by a short straight bar 17 formed integral with the bars 15, and both bars 16 are similarly connected at their rear ends by a short bar 18 formed integral with the bars 16. The purpose of these flat bars 17 and 18 is to receive between them a sheet metal plate 19 which forms a hanger for supporting the rear end of the hereinafter described pivoted draft frame. The plate 19 and the straight bars 17 and 18 are rigidly riveted together as shown at 20, or otherwise rigidly connected together.

The draft frame is substantially triangular in contour and comprises a front bar 21 which extends below and longitudinally of the front bar 11 of the main frame as best shown in Figure 4, and side bars 22 which converge from the ends of the front bar to the hanger 19 where they are connected by a short transverse bar 23. A pivot pin 24 is passed through the bar 23 and through the hanger 19 to pivotally secure the rear end of the draft frame to the hanger.

A bar 25 is rigidly secured at the upper end to the front bar 11 of the frame in any preferred manner and extends downwardly to form a hanger for pivotally supporting the front bar 21 of the draft frame. A pivot pin 26 is passed through the bar 21 of the draft frame, and through the hanger 25, and is disposed in alignment with the above mentioned pivot pin 24 so that the frame may rock laterally on both pivot pins as an axis. By thus spacing the pivot pins of the draft frame from each other and mounting one pivot pin in a hanger depending from the front bar of the main frame and mounting the other pivot pin in a hanger depending from the X-shaped brace, the shocks and jars will be distributed uniformly to the front bar 12 and to both side bars and to the rear bar 13 of the frame by means of the inclined bars 15 and 16 which extend from the rear hanger 19 to the corners of the main frame.

A handle nut 27 is threaded on the front pivot pin 26 of the draft frame. The shank 28 of a front caster wheel 29, which forms a prop for the trailer when it is not being drawn behind the automobile, is slotted as shown at 30 to receive the pivot pin 26 between the handle nut and the front bar 21 of the draft frame. This handle nut may be frictionally engaged against the shank 28 with sufficient pressure to hold the shank engaged with a U-shaped guide 8 through which the pivot pin 26 passes, the confronting faces of the guide and of the shank being serrated as shown to prevent slipping of the parts, and hold the shank in desired adjusted position. The nut does not exert sufficient pressure to prevent the draft frame rocking freely on its pivot pins 24 and 26 to compensate for inequalities in the roadbed.

Figure 5:
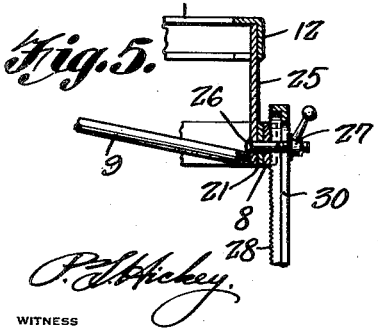
Figure 5 is a detail sectional view of the front caster wheel shank taken on the line 5—5 of Figure 2.

A brace rod 9 extends longitudinally of the draft frame. The rod is inclined upwardly from the front hanger bar 25 to the rear hanger bar 19, as best shown in Figures 4 and 5, and reinforces the front hanger bar against being accidentally deformed.

Figure 2:
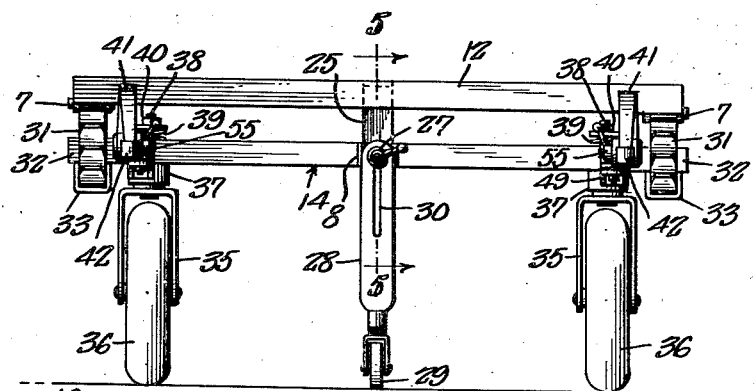
Figure 2 is a front elevation of the parts shown in Figure 1.

By referring to Figures 1 and 2 it will be seen that a pair of longitudinal leaf springs 31 of the semi-elliptical type are connected by shackles 7 to the side bars 10 and 11 of the main frame. As shown in Figures 1 and 3 channel bars 32 extend transversely of the leaf springs 31 and are rigidly secured at the ends to the springs by U-bolts 33 passed through plates 34 supported by the bars 32. Thus both leaf springs are rigidly secured together for flexing movement as a unit.

The forks 35 of a pair of caster wheels 36 are pivotally mounted in bearings 37 supported by the channel bars 32 and turn through an angle of 360 degrees as described in my above identified prior application. As shown in Figure 1, the spindles 38 of the forks are provided with anti-rattle helical springs 39 which are confined between the bearings and nuts 40 on the spindles and automatically take up wear as well as prevent rattle.

Figure 6:
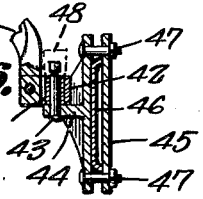
Figure 6 is a detail sectional view showing the connection of one of the draft tongues with a rear bumper.

As shown in Figures 1 and 6, a pair of arched draft tongues 41 are provided at the front ends with pivoted strap yokes 42 to receive bushed pivot pins 43 which are integral with lugs 44 on one of a pair of plates 45 which are clamped to opposite sides of the automobile rear bumper 46 by bolts 47. Locks 48 are secured to the pivot pins 43 to prevent dislodgement of the draft tongues.

The rear ends of the draft tongues are secured for vertical and lateral adjustment on the front bar 21 of the pivoted draft frame 14. For this purpose the front bar 21 is provided with brackets 48' shown best in Figure 4, having forwardly extending lugs 49 the upper surfaces of which are serrated to receive the correspondingly serrated bottom faces of the circular bases 50 of tubular bearings 51 through which, and through the lugs 49, vertically disposed pivot pins 52 are passed. The bearings are provided with hinge ears 53 to receive the rear ends of the draft tongues 41.

The hinge ears 53 are serrated, as also are eyes on the rear ends of the draft tongues, and horizontally disposed pivot bolts 54 are passed through the ears and through the eyes of the draft tongue. Handle nuts 55, best shown in Figure 2, and similar to the handle nut 27 previously described are threaded onto the pivot bolts. These handle nuts hold the draft tongues in vertically adjusted position on the horizontal pivot bolts 54 to compensate for various heights of rear bumpers above the ground. Loosening of the vertical pivot bolts 52 permit the draft tongues being adjusted laterally around the pivot bolts 52 as an axis to dispose the front ends of the draft tongues at a desired distance apart to adjust the draft tongues to be easily applied to the pivot pins 43 of the attaching lugs 44.

Since the operation of the parts has been described as the description of the parts progressed it is thought that the invention will be fully understood without further explanation.

What is claimed is:

1. In a hitch device, a substantially rectangular supporting frame having sides and ends, a substantially X-shaped brace having its legs connected to and reinforcing the side and ends of the frame, a pair of aligned hangers depending from one end of the frame and from the X-shaped brace at the intersections of the legs thereof respectively, and a draft frame pivotally suspended at the ends of its longitudinal axis on the hangers.

2. In a hitch device, a supporting frame, a substantially X-shaped brace having its legs terminally secured to and reinforcing the frame, a rear hanger depending from the X-shaped brace at the intersection of the legs of the brace, a front hanger depending from the frame in alignment with said rear hanger, a substantially triangular horizontally disposed draft frame below the supporting frame and pivotally mounted at the ends of its longitudinal median axis on both hangers, and means for coupling the draft frame to a towing vehicle.

3. In a hitch device, a supporting frame, a substantially X-shaped brace having the ends of its legs rigidly secured to the corners of the frame, a rear hanger depending from the brace at the juncture at which the legs meet, a front hanger depending from the frame, a draft frame pivotally mounted at the ends of its median axis on both hangers, the X-shaped brace distributing the draft strain exerted upon its associated hanger uniformly throughout the supporting frame, and means for coupling the draft frame to a towing vehicle.

4. In trailer construction, a body supporting wheeled frame, an X-shaped brace having the legs secured to the frame, aligned front and rear hangers depending from the frame and the juncture of the brace legs respectively at substantially the median plane of the frame, a draft frame pivotally mounted at the ends of its median longitudinal axis on both hangers to rock vertically at each side to conform to inequalities in the road bed, and means connected to the draft frame for coupling the frame to a towing vehicle.

ARLEY D. CARPENTER.